US007846567B2

(12) United States Patent
Okura et al.

(10) Patent No.: US 7,846,567 B2
(45) Date of Patent: Dec. 7, 2010

(54) MAGNETIC DISK FOR HARD DISK DRIVES

(75) Inventors: Yasutaka Okura, Hitachinaka (JP); Tomio Iwasaki, Tsukuba (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 12/127,856

(22) Filed: May 28, 2008

(65) Prior Publication Data
US 2008/0297947 A1    Dec. 4, 2008

(30) Foreign Application Priority Data
May 31, 2007    (JP) .............................. 2007-145586

(51) Int. Cl.
G11B 5/70    (2006.01)
(52) U.S. Cl. ................................. 428/848.5
(58) Field of Classification Search ....................... None
See application file for complete search history.

(56) References Cited
U.S. PATENT DOCUMENTS
2006/0063042 A1    3/2006    Takai
2006/0163195 A1    7/2006    Bandic
2006/0269795 A1    11/2006   Yanagita
2007/0000861 A1    1/2007    Kamata FOREIGN PATENT DOCUMENTS
DE    103 52 778    6/2004
JP    05-258291    10/1993
JP    2005-251270    9/2005
JP    2006-147148    6/2006
WO    WO 93/12520    6/1993
WO    WO 2007/055345    5/2007

Primary Examiner—Holly Rickman
(74) Attorney, Agent, or Firm—Antonelli, Terry, Stout & Kraus, LLP.

(57) ABSTRACT

The present invention provides a magnetic disk in a discrete track medium and a patterned medium, which prevents the loss of the magnetically recorded data when a head of a magnetic disk device contacts the magnetic disk, and a manufacturing method thereof. A magnetic disk has a protrusion as a non-magnetic member formed on a disk surface to prevent a head from being in contact with a recording section. When the protrusion formed in a disk substrate collides against the head, the protrusion 7 does not collapse, and accordingly, the recording layer is not damaged. Alternatively, concave and convex portions are formed on the substrate surface to use the convex portion as the protrusion.

12 Claims, 11 Drawing Sheets

MAGNETIC DISK FOR HARD DISK DRIVES

BACKGROUND OF THE INVENTION

The present invention relates to a magnetic disk installed in a magnetic disk device, and more particularly, to a magnetic disk such as a discrete track medium and a patterned medium, and a manufacturing method thereof.

Recently, the attempt to introduce various types of technology has been made along with the trend of larger capacity and higher memory density of the magnetic disk device. For example, a magnetic disk such as a discrete track medium and a patterned medium has been proposed for enhancing the recording density. The magnetic disk device using the aforementioned magnetic disk has further reduced the distance between the magnetic head and the magnetic disk, which is as narrow as the value around 10 nm or less. Meanwhile, the reduced distance between the magnetic head and the magnetic disk is likely to cause the collision therebetween.

Japanese Unexamined Patent Application Publication No. 2006-147148 discloses the magnetic recording medium provided with plural recording tracks formed of the ferromagnetic members separately arranged on the soft magnetic layer on the non-magnetic substrate, each having a cross section protruding widthwise, and a carbon layer formed on the upper surface of the respective recording tracks and the soft magnetic layer between plural recording tracks such that the thickness of the carbon layer formed on the upper surface of the recording track is larger than that of the carbon layer formed on the soft magnetic layer between the plural recording tracks for forming the patterned medium with excellent durability capable of performing the high density recording.

Japanese Unexamined Patent Application Publication No. 5-258291 discloses the discrete disk having the sliding portion and the storage portion of the head and the disk separated, in which the hill-like structure serving as the separated bulkhead and the sliding portion is formed of the non-magnetic material with high wear resistance which is different from the material for forming the substrate so as to enhance the durability of the disk against the continuous sliding operations of the head and the disk.

As described in Japanese Unexamined Patent Application Publication No. 2006-147148, when the protrusion exists on the disk surface, and the head collides against the protrusion, the mechanical strength is deteriorated compared with the generally employed magnetic disk, for example, the recording film is likely to be peeled off or deformed owing to the sliding operation of the head.

As described in Japanese Unexamined Patent Application Publication No. 5-258291, when the hill portion is formed of the material with high wear resistance that is different from the one for forming the substrate, the durability of the portion on which the magnetic head slides becomes higher. As the number of interfaces between different materials increases, the rupture or the peeling occurs at the portion with weak strength of the interface between the different materials, that is, the hill-forming material and the material in contact with the hill. As a result, the hill collapses to cause the plastic deformation of the recording layer, thus erasing the magnetic record. Peeling of the interface between different materials causes corrosion of the magnetic disk.

SUMMARY OF THE INVENTION

It is an object of the present invention to provide a magnetic disk with a structure which prevents the magnetic recording section from being in contact with the magnetic head, and a method for manufacturing the magnetic disk.

In the first aspect of the present invention, the protrusion as the non-magnetic member is formed on the disk surface so as to project higher than the magnetic recording layer for preventing the contact between the magnetic head and the magnetic recording section of the magnetic disk. In the second aspect of the present invention, the protrusion is formed in the disk substrate. Even if the magnetic head collides against the protrusion, the structure prevents the protrusion from collapsing so as not to damage the magnetic recording layer. The substrate is processed to have the concave and convex portions on the surface such that the magnetic recording layer is formed to slightly project to be higher than the magnetic recording layer.

The present invention provides the magnetic disk with high durability against the contact with the magnetic head. The improvement in the durability enhances the corrosion resistance so as to provide the magnetic disk with high reliability.

DETAILED DESCRIPTION OF THE INVENTION

Figure 1:
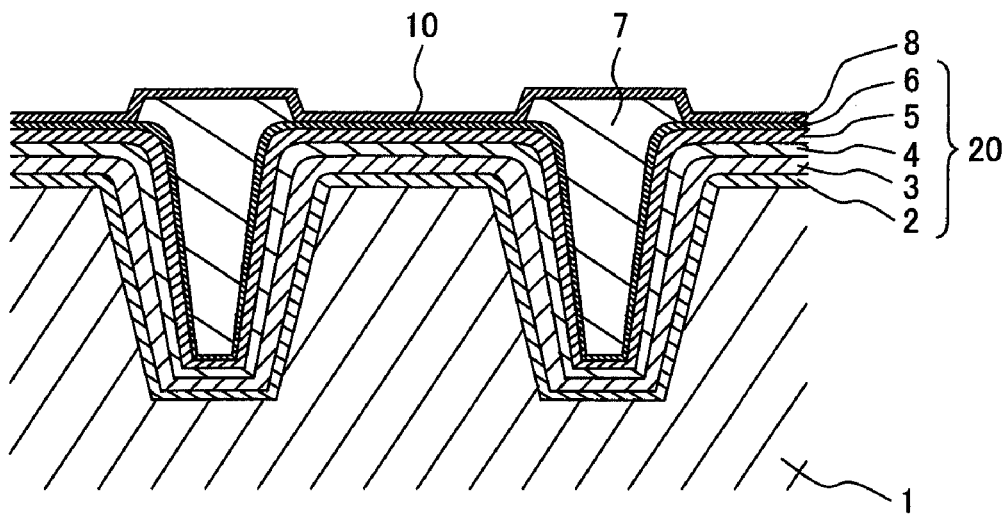
FIG. 1 is a sectional view showing an essential portion of a magnetic disk according to a first embodiment.

Embodiments will be described referring to the drawings.

First Embodiment

Figure 2:
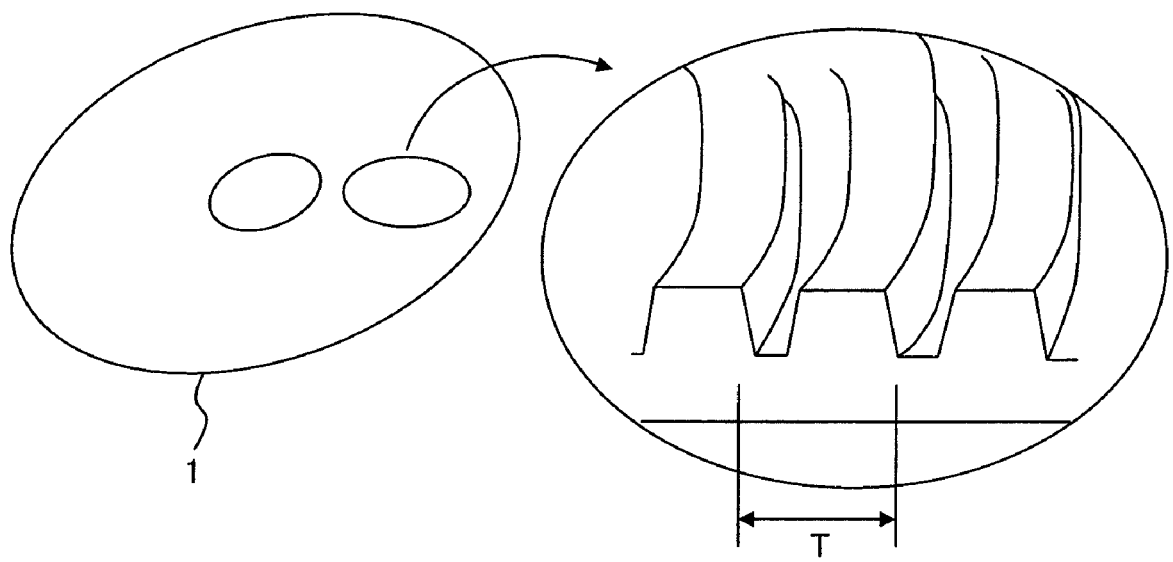
FIG. 2 is a view schematically showing a structure of a substrate of a discrete track medium.

FIG. 2 shows a structure of a substrate of a magnetic disk (discrete track medium) according to a first embodiment. A substrate 1 is formed as the non-magnetic substrate, for example, glass, and has concave and convex portions concentrically (annually) arranged each at the track pitch T. FIG. 1 is a partially sectional view showing the state where the magnetic recording section and the protrusion are formed on a concave/convex surface of the substrate 1. The magnetic recording section is formed as a multi-layer film 20 formed by sequentially laminating an underlayer 2, a soft magnetic underlayer 3, an intermediate layer 4, a recording layer 5, and a hard overcoat 6 on the concave/convex surface of the substrate 1. A protrusion 7 is formed in the concave portion of the substrate 1 and the multi-layer film 20. A lubrication layer (overcoat) 8 is formed on the hard overcoat 6 and the protrusion 7. The protrusion 7 which is formed of the non-magnetic material projects to be 2 nm to 10 nm higher than the magnetic recording section 10 interposed between the protrusions 7. The protrusion 7 serves to prevent the collision of the magnetic recording section 10 against the magnetic head. When the magnetic head collides against the protrusion 7 formed in the substrate 1, the protrusion 7 may be prevented from collapsing. This makes it possible to prevent the loss of the magnetically recorded data owing to deformation of the magnetic recording section 10. The interface of the protrusion 7 between different materials is formed at the single section between the protrusion 7 and the hard overcoat 6. This makes it possible to reduce the risk of peeling of the interface between the different materials compared with Japanese Unexamined Patent Application Publication No. 2006-147148, resulting in the structure with excellent corrosion resistance.

Figure 3:
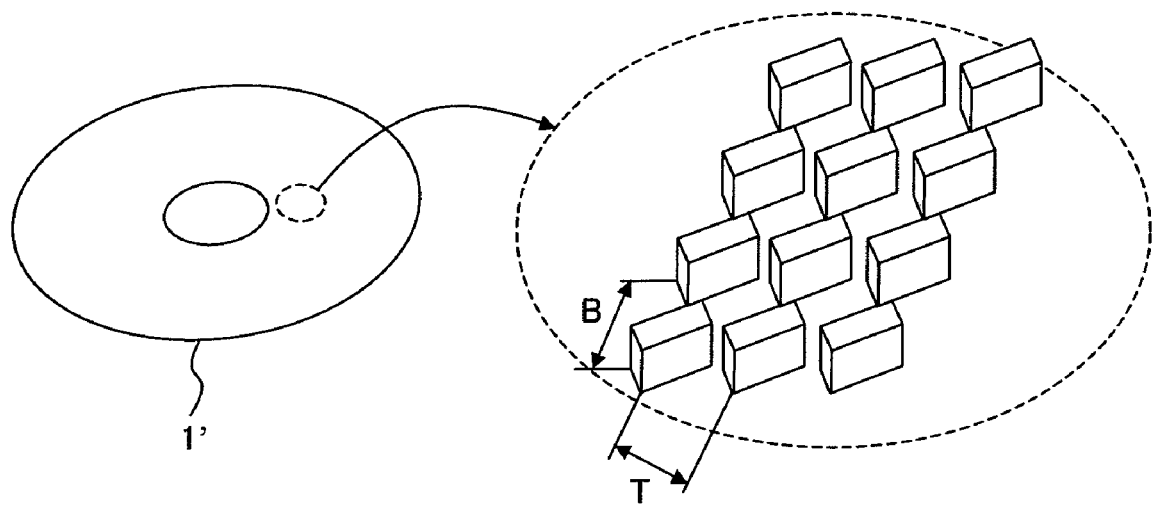
FIG. 3 is a view schematically showing a structure of a substrate of a patterned medium.

FIG. 3 shows the substrate structure of the patterned medium. A substrate 1' is a non-magnetic member likewise the one as described above, for example, the glass, which has concave and convex portions for forming the protrusions (irregular pattern) at track pitches T and bit cycles B. Structures of the multi-layer film 20 formed on the concave/convex surface of the substrate 1', and the protrusion 7 formed in the substrate 1' and the concave portion of the multi-layer film 20 are the same as those shown in FIG. 1.

Figure 4:
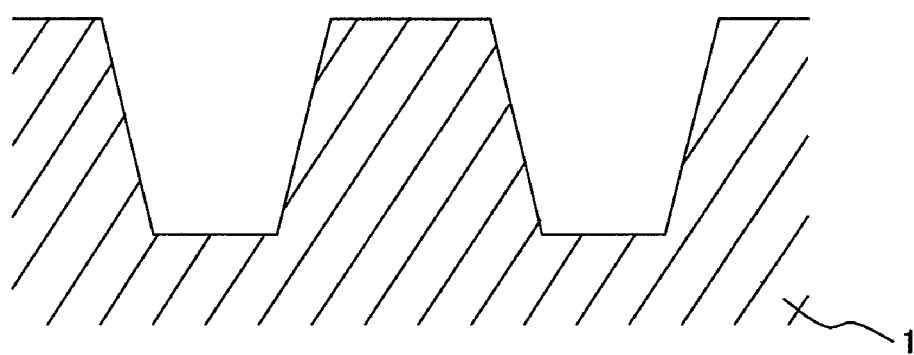
FIG. 4 is a view showing a step of manufacturing the magnetic disk according to the first embodiment.
Figure 5:
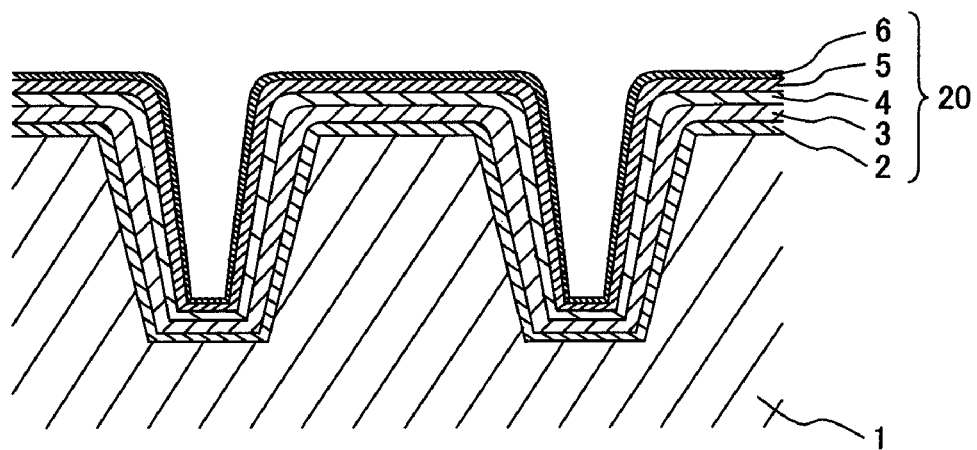
FIG. 5 is a view showing the step of manufacturing the magnetic disk according to the first embodiment.
Figure 6:
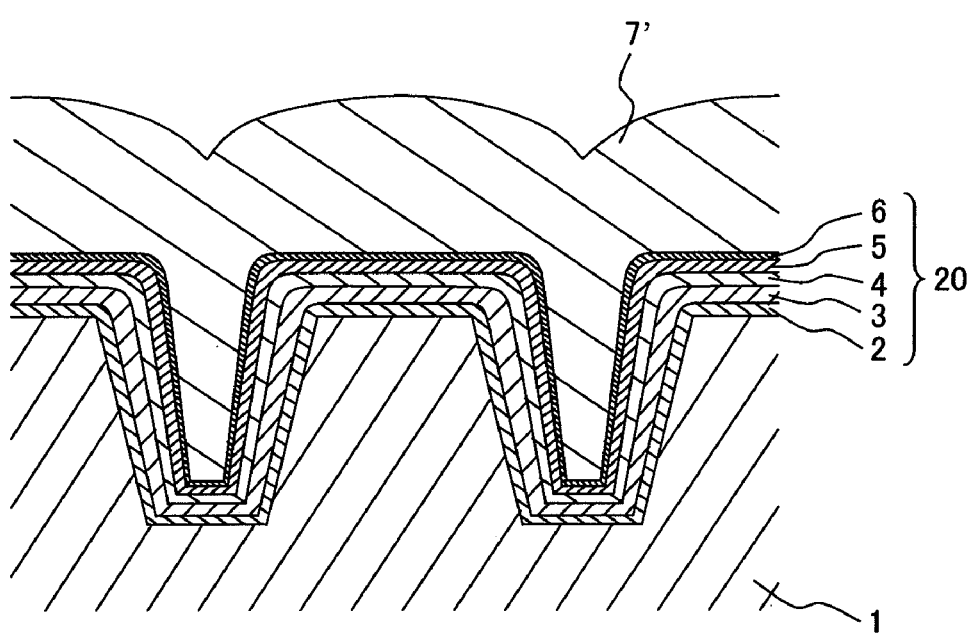
FIG. 6 is a view showing the step of manufacturing the magnetic disk according to the first embodiment.
Figure 7:
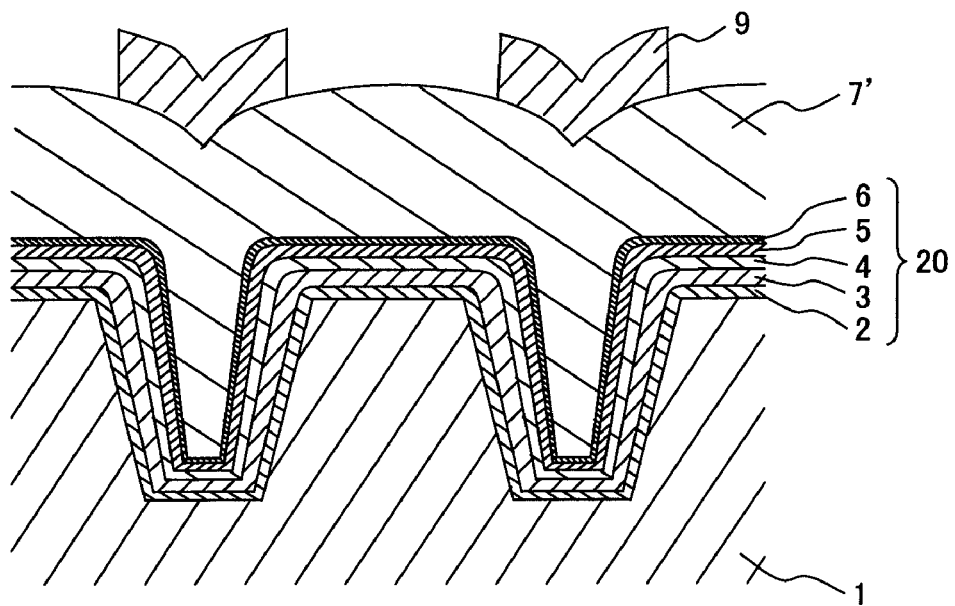
FIG. 7 is a view showing the step of manufacturing the magnetic disk according to the first embodiment.
Figure 8:
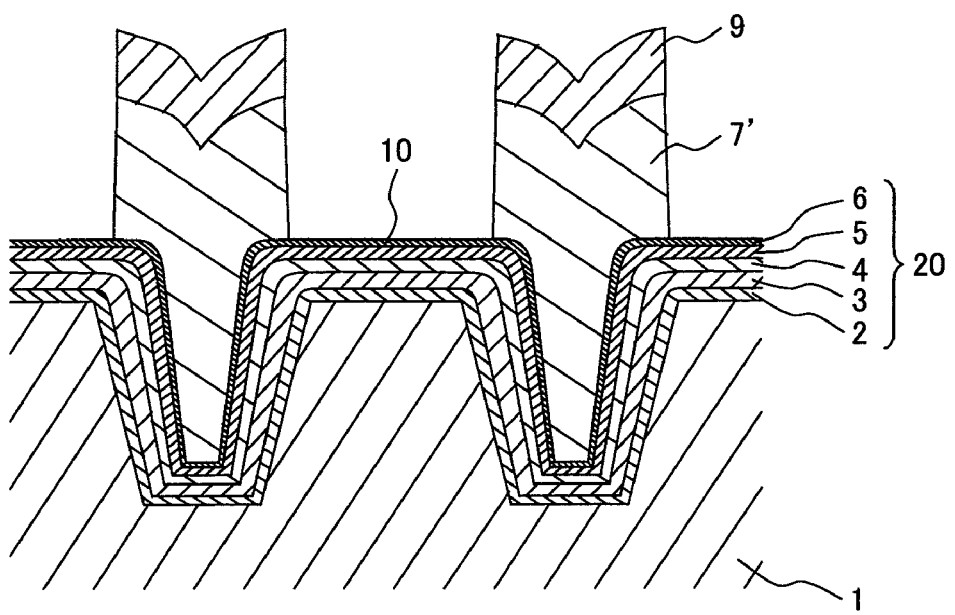
FIG. 8 is a view showing the step of manufacturing the magnetic disk according to the first embodiment.
Figure 9:
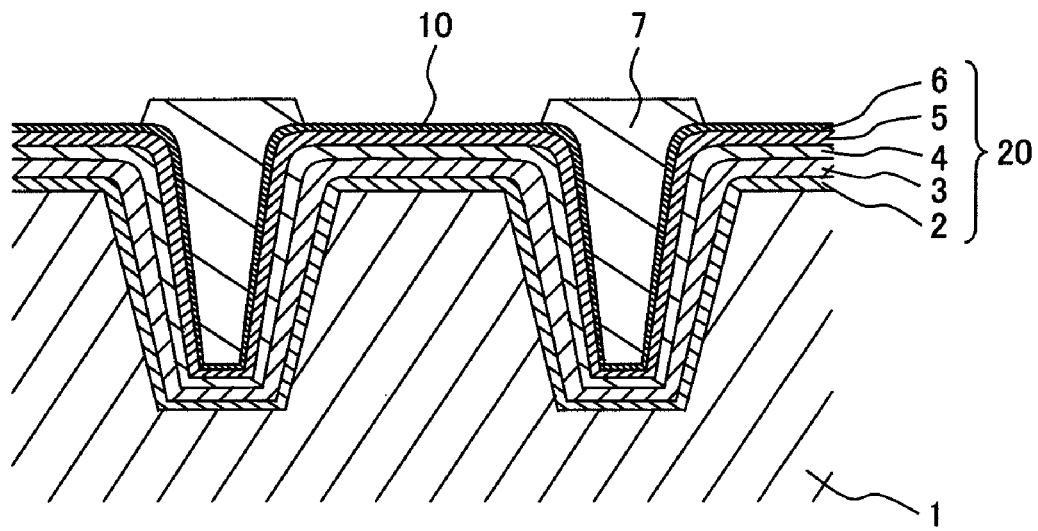
FIG. 9 is a view showing the step of manufacturing the magnetic disk according to the first embodiment.

Referring to FIGS. 4 to 9, the method for manufacturing the magnetic disk (discrete track medium) according to the first embodiment will be described. As shown in FIG. 4, the concentric concave and convex portions are formed on the substrate 1 as the glass through the nanoimprint technology. Referring to FIG. 5, the multi-layer film 20 is formed by sequentially laminating the underlayer 2, the soft magnetic underlayer 3, the intermediate layer 4, the recording layer 5 and the hard overcoat 6 through such film-forming process as sputtering and chemical vapor deposition. The underlayer 2 as the tight fit layer is preferably formed of the Al—Ti alloy. The soft magnetic underlayer 3 as the high permeability magnetic layer is preferably formed of the Fe—Co alloy. The intermediate layer 4 for subjecting the recording layer 5 to the epitaxial growing is preferably formed of Ru. The recording layer 5 as the magnetic recording layer is preferably formed of the Co—Cr—Pt alloy, for example. The hard overcoat 6 may be formed of the diamond-like carbon layer. Referring to FIG. 6, a non-magnetic material 7' such as $Al_2O_3$ is laminated through the film-forming process such as sputtering and chemical vapor deposition so as to mask the portion which is expected to be formed as the protrusion 7 with a resist film 9 as shown in FIG. 7. Then etching such as the ion milling is performed to expose the portion to be formed as the magnetic recording section 10 as shown in FIG. 8. The polishing is performed through the chemical mechanical polishing for adjusting the height of the protrusion 7 as shown in FIG. 9. The protrusion 7 is formed to be 2 nm to 10 nm higher than the magnetic recording section 10. Finally, the lubricant is applied to form the lubrication layer (overcoat) 8 to form the structure as shown in FIG. 1, where a surface portion of the overcoat which covers and is formed over the protrusion projects above and is higher than another surface portion of the overcoat which covers and is formed over the magnetic recording section formed on at least the annular convex portion of the substrate. As the lubricant, perfluoroalkylpolyether may be used.

The method for manufacturing the patterned medium is basically the same as the method for manufacturing the aforementioned discrete track medium except that the concave and convex portions are formed on the substrate. Referring to FIG. 3, the concave and convex portions are formed on the substrate 1' as the glass through the nanoimprint technology such that the convex portions are regularly arranged each at the track pitch T and the bit cycle B. Referring to FIGS. 5 to 9, the multi-layer film 20 is formed on the concave/convex surface to form the protrusion 7 in the concave portion of the substrate 1' and the multi-layer film 20. The sectional structure is the same as the one shown in FIG. 1.

Figure 10:
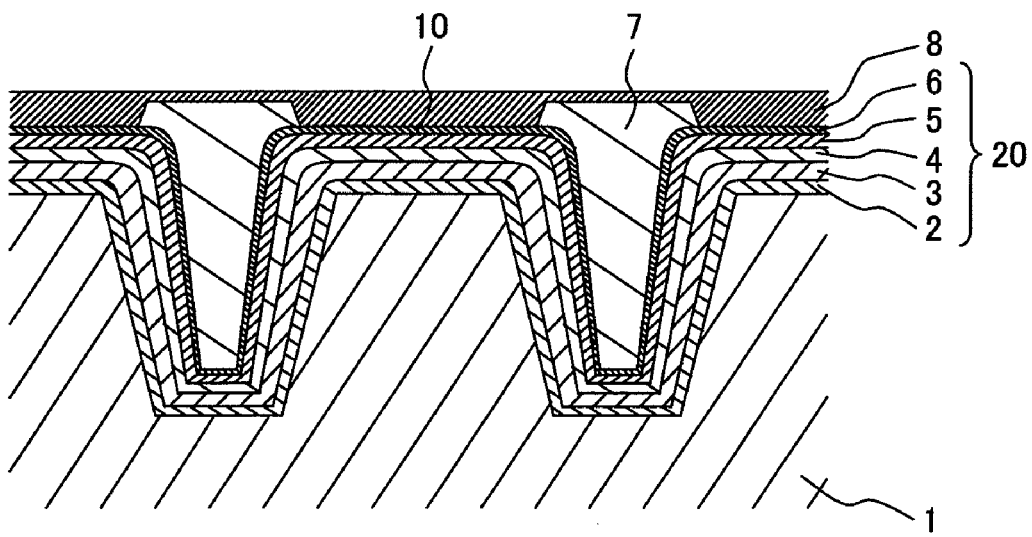
FIG. 10 is a sectional view showing an essential portion of a modified example of the magnetic disk according to the first embodiment.

In the first embodiment, the lubrication layer (overcoat) 8 is formed on the concave/convex surface of the recording section 10 and the protrusion 7. The lubricant is applied to the recording section 10 to be substantially thicker than the other portion as shown in FIG. 10 such that the disk surface is flattened. In this case, as the disk surface is flat, the floating fluctuation of the magnetic head which is lifted above may be suppressed. The structure allows the magnetic head to perform the stable writing and reading.

Second Embodiment

Figure 11:
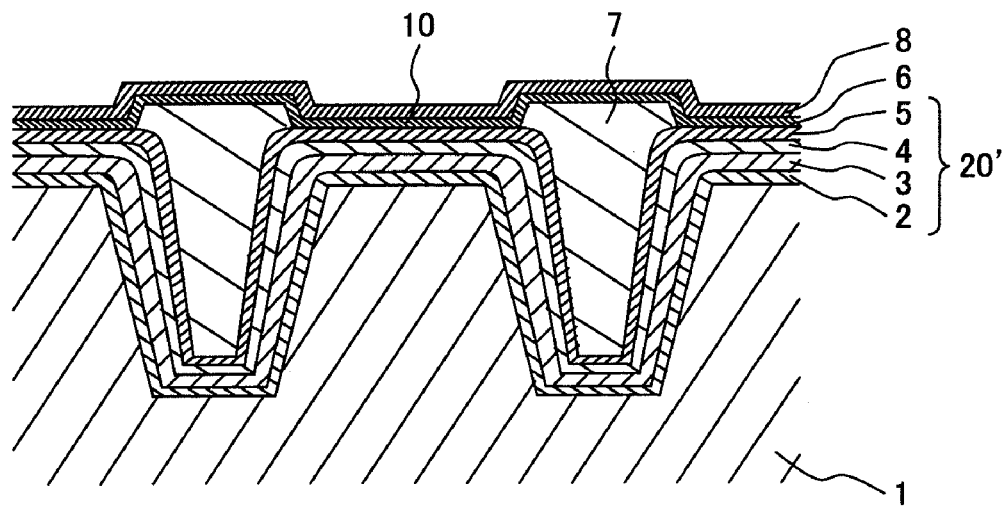
FIG. 11 is a sectional view showing an essential portion of a magnetic disk according to a second embodiment.

FIG. 11 shows the cross section of the essential portion of a magnetic disk according to a second embodiment. The magnetic disk according to the second embodiment includes a substrate 1 (1') with concentric concave and convex portions, or concave and convex portions having the convex portions regularly arranged at intervals each at the track pitch T and the bit cycle B, and a multi-layer film 20' formed by sequentially laminating the underlayer 2, the soft magnetic underlayer 3, the intermediate layer 4, and the recording layer 5. The protrusion 7 as the non-magnetic member is formed in the concave portion of the substrate 1 (1'). The hard overcoat 6 is laminated on the recording layer 5 and the protrusion 7. The lubrication layer 8 is further formed on the hard overcoat 6. In the second embodiment, the layer formed by laminating the hard overcoat 6 and the lubrication layer 8 will be referred to as an overcoat. The protrusion 7 projects to be 2 nm to 10 nm higher than the recording section 10 interposed between the protrusions 7. In the aforementioned structure, the protrusion 7 prevents the recoding section 10 from being collided against the magnetic head. When the protrusion 7 formed in the substrate 1 collides against the magnetic head, it does not collapse, and accordingly, the magnetic section 10 does not deform, thus preventing the loss of the magnetically recorded data. As the protrusion 7 is formed, two types of interface between different materials may be formed, that is, the one between the protrusion 7 and the hard overcoat 6, and the other between the protrusion 7 and the recording layer 5. Unlike Japanese Unexamined Patent Application Publication No. 2006-147148, the risk of peeling of the interface between the different materials may be suppressed. The wear resistance of the protrusion 7 on which the hard overcoat 6 is formed may further be improved compared with the first embodiment.

Figure 12:
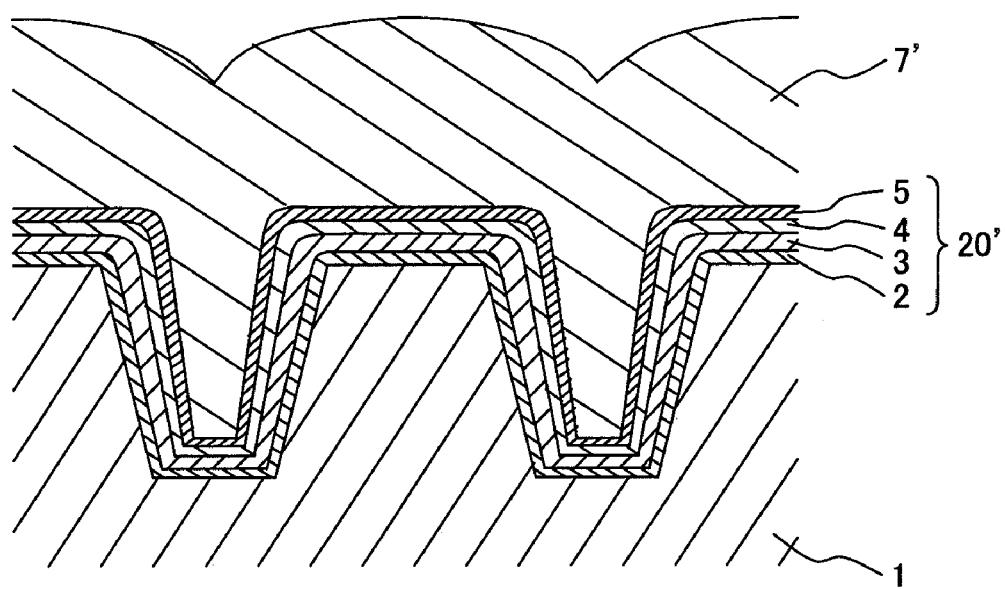
FIG. 12 is a view showing a step of manufacturing the magnetic disk according to the second embodiment.
Figure 13:
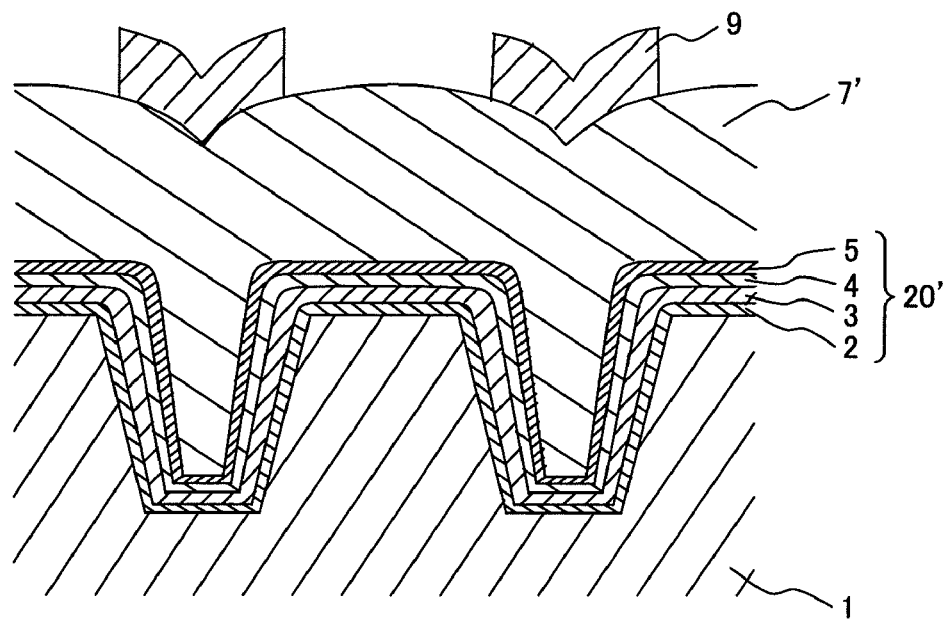
FIG. 13 is a view showing the step of manufacturing the magnetic disk according to the second embodiment.
Figure 14:
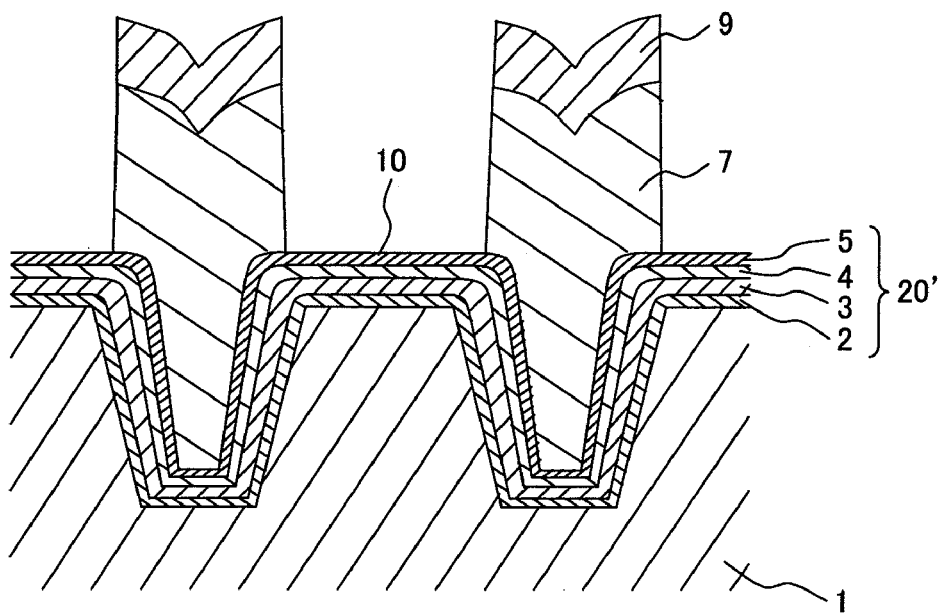
FIG. 14 is a view showing the step of manufacturing the magnetic disk according to the second embodiment.
Figure 15:
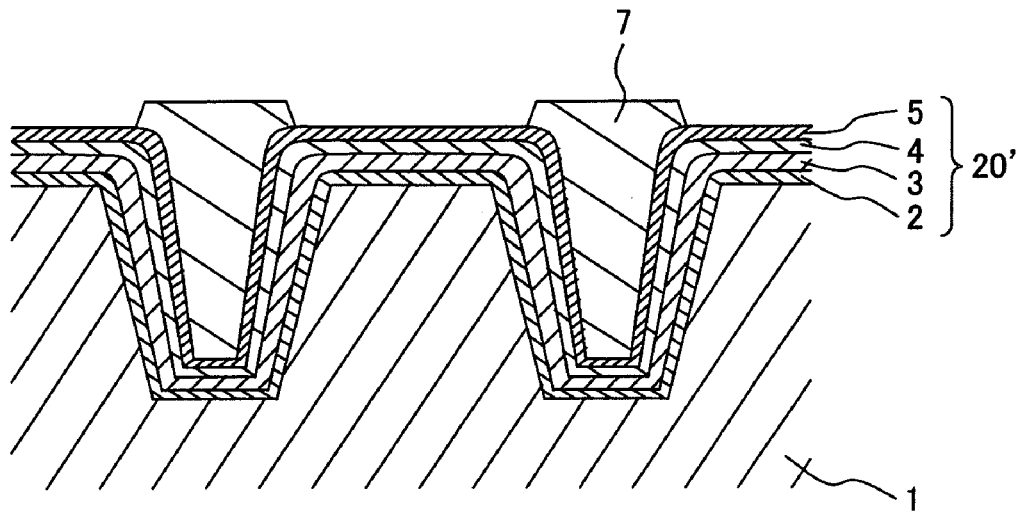
FIG. 15 is a view showing the step of manufacturing the magnetic disk according to the second embodiment.
Figure 16:
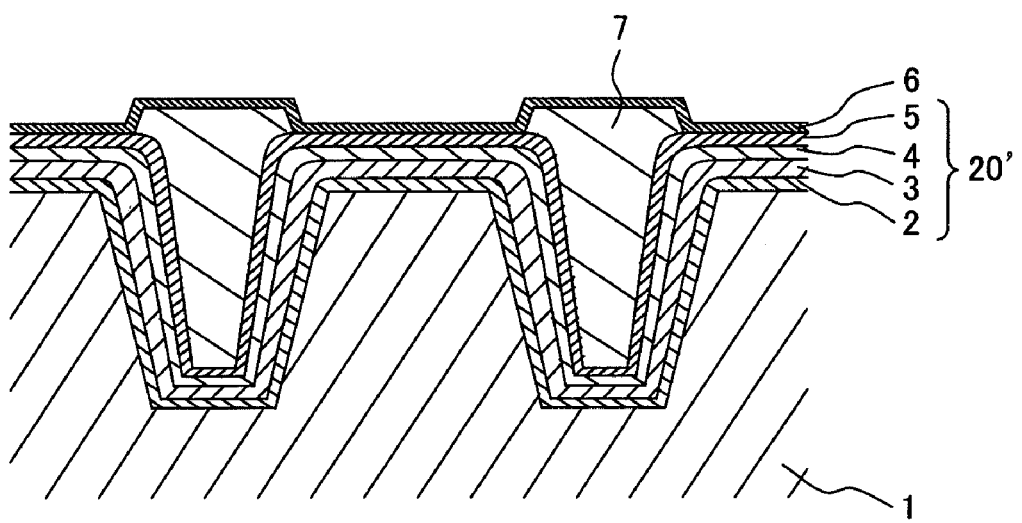
FIG. 16 is a view showing the step of manufacturing the magnetic disk according to the second embodiment.

In the manufacturing method according to the second embodiment, the concave and convex portions are formed on the substrate 1 (1') through the nanoimprint technology as shown in FIG. 2 in the same manner as in the first embodiment. Then the underlayer 2, the soft magnetic underlayer 3, the intermediate layer 4, the recording layer 5, and the non-magnetic material 7' are sequentially laminated through the film-forming process such as sputtering and chemical vapor deposition as shown in FIG. 12. Each material for forming the underlayer 2, the soft magnetic underlayer 3, the intermediate layer 4, the recording layer 5, and the non-magnetic material 7' is the same as the one described in the first embodiment. Referring to FIG. 13, the area to be formed as the protrusion 7 is masked with the resist film 9 and the like. Then etching such as the ion milling is performed to expose the magnetic recording section 10 as shown in FIG. 14. The polishing such as chemical mechanical polishing is performed to adjust the height of the protrusion 7 as shown in FIG. 15 such that the protrusion 7 becomes higher than the recording section 10 by 2 nm to 10 nm. Then the hard overcoat 6 is laminated to cover the recording layer and the protrusion 7 as shown in FIG. 16. Finally, the lubrication layer 8 is formed by applying the lubricant to form the structure as shown in FIG. 11.

Figure 17:
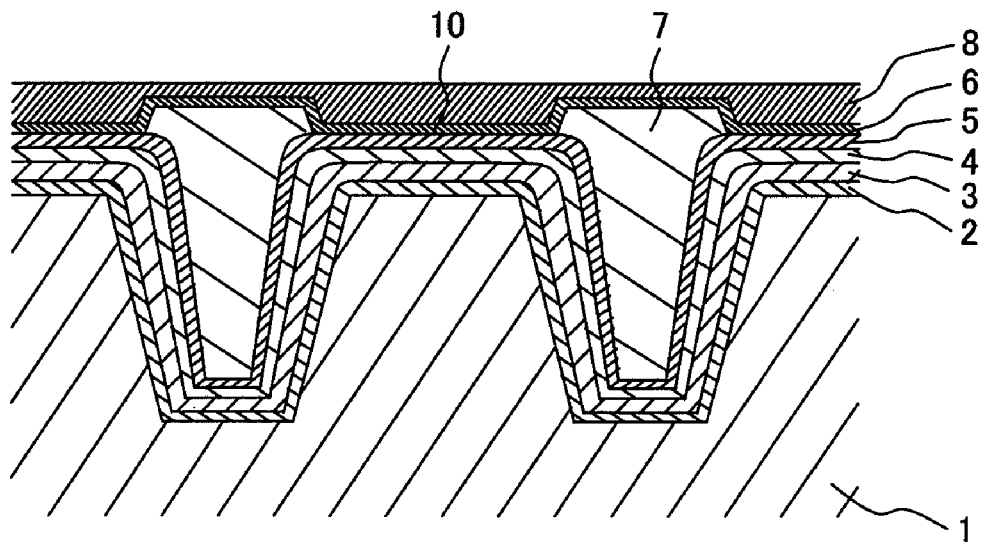
FIG. 17 is a sectional view showing an essential portion of a modified example of the magnetic disk according to the second embodiment.

In the second embodiment, as shown in FIG. 17, the lubricant may be applied to the magnetic recording section to be relatively thicker than the other portion to flatten the disk surface likewise the first embodiment. This makes it possible to suppress the floating fluctuation of the magnetic head, thus allowing the magnetic head to perform the stable writing and reading.

Third Embodiment

Figure 18:
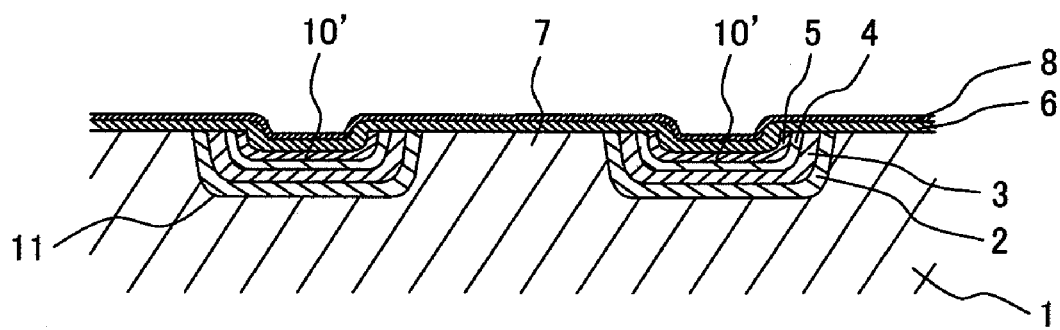
FIG. 18 is a sectional view showing an essential portion of a magnetic disk according to a third embodiment.

FIG. 18 shows the cross section of the essential portion of a magnetic disk according to a third embodiment. The magnetic disk according to the third embodiment includes a magnetic recording section 10' formed by laminating the underlayer 2, the soft magnetic underlayer 3, the intermediate layer 4, and the recording layer 5 sequentially in the concave portion on the concave/convex surface of the substrate 1 (1'). The hard overcoat 6 is further laminated on the protrusion 7 as the convex portion of the substrate 1 and the magnetic recording section 10'. The lubrication layer 8 is further formed on the hard overcoat 6. The surface of the magnetic recording section 10' is formed to have the height lower than that of the protrusion 7. The protrusion 7 formed on the substrate 1 (1') prevents the collision between the magnetic recording section 10' and the magnetic head. When the protrusion 7 formed as the portion of the substrate 1 (1') collides against the magnetic head, it does not collapse, and accordingly, the recording section 10' is not deformed, thus preventing the loss of the magnetically recorded data.

Each corner 11 of the concave portion of the substrate 1 (1') is rounded to be curved so as to reduce the concentration of stress of the corner 11 resulting from the collision between the protrusion 7 and the magnetic head.

Figure 19:
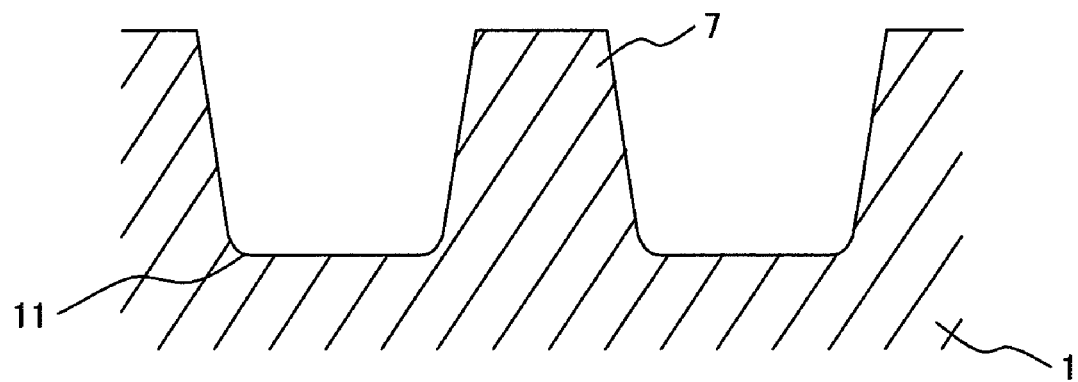
FIG. 19 is a view showing a step of manufacturing the magnetic disk according to the third embodiment.
Figure 20:
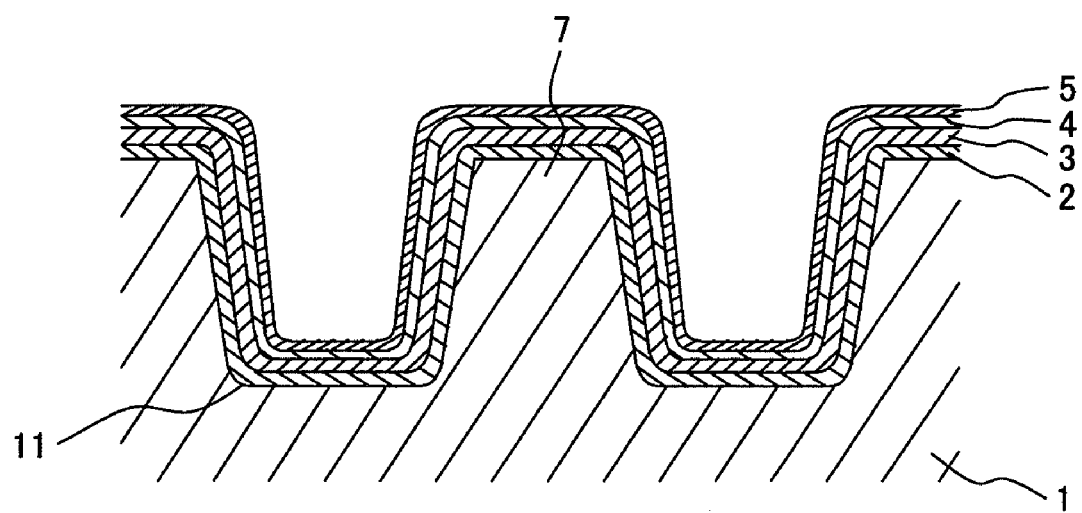
FIG. 20 is a view showing the step of manufacturing the magnetic disk according to the third embodiment.
Figure 21:
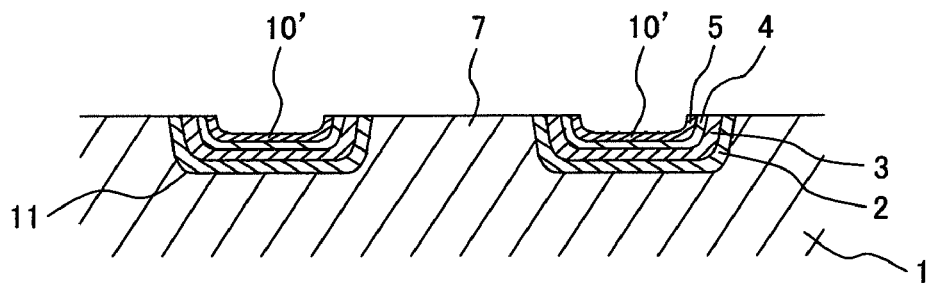
FIG. 21 is a view showing the step of manufacturing the magnetic disk according to the third embodiment.
Figure 22:
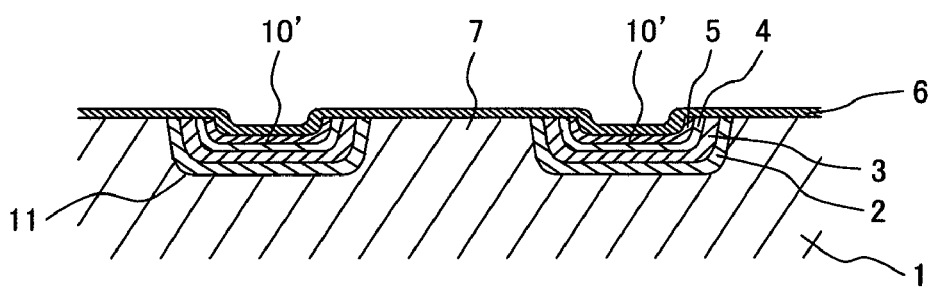
FIG. 22 is a view showing the step of manufacturing the magnetic disk according to the third embodiment.

In the manufacturing method, the concave and convex portions are formed on the substrate 1 (1') through the nanoimprint technology as shown in FIG. 19, and at the same time, each corner 11 of the concave portions is rounded to reduce the stress concentration. Then as shown in FIG. 20, the underlayer 2, the soft magnetic underlayer 3, the intermediate layer 4, and the recording layer 5 are sequentially laminated through the film-forming process such as sputtering and chemical vapor deposition. Then as shown in FIG. 21, the substrate surface is polished through the chemical mechanical polishing to form the protrusion 7 to be higher than the magnetic recording section 10' by 2 nm to 10 nm. Then the hard overcoat 6 is laminated to cover the protrusion 7 and the recording section 10' as shown in FIG. 22. Finally, the lubricant is applied to form the lubrication layer 8 to produce the structure as shown in FIG. 18.

Figure 23:
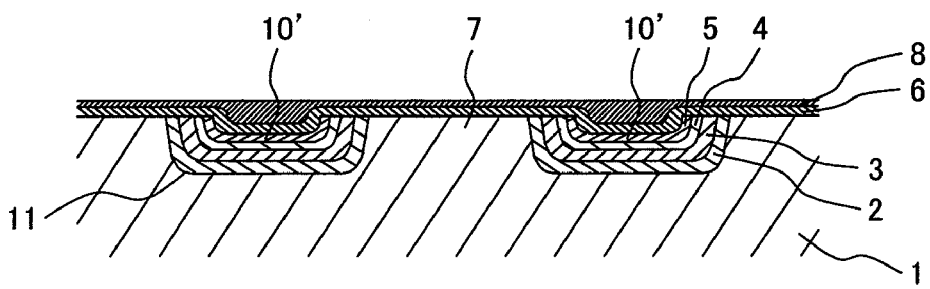
FIG. 23 is a sectional view showing an essential portion of the magnetic disk according to the third embodiment.

In the third embodiment, the lubricant may be applied to the magnetic recording section 10' to be relatively thicker than the other portion to flatten the disk surface as shown in FIG. 23. The floating fluctuation of the magnetic head, thus, may be suppressed, allowing the magnetic head to perform the stable writing and reading.

What is claimed is:

1. A magnetic disk comprising:
   a substrate having annular convex and concave portions;
   a magnetic recording section formed on at least the annular convex portion on the substrate;
   a protrusion formed of a non-magnetic material, which is formed in the annular concave portion of the substrate and which projects from the annular concave portion so as to have a surface higher than a surface of the magnetic recording section formed on at least the annular convex portion of the substrate; and
   an overcoat which covers the magnetic recording section and the protrusion and which is formed in accordance with a shape of the magnetic recording section and the protrusion;
   wherein a surface portion of the overcoat which covers and is formed over the protrusion projects above and is higher than another surface portion of the overcoat which covers and is formed over the magnetic recording section formed on at least the annular convex portion of the substrate.

2. The magnetic disk according to claim 1, wherein the annular convex portions form an irregular pattern separated in a circumferential direction of the substrate.

3. The magnetic disk according to claim 1, wherein the surface of the protrusion projects to be 2 nm to 10 nm higher than the surface of the magnetic recording section formed on at least the annular convex portion.

4. The magnetic disk according to claim 1, wherein the magnetic recording section is a multi-layer film formed by laminating an underlayer, a soft magnetic underlayer, an intermediate layer, a recording layer, and a hard overcoat layer.

5. The magnetic disk according to claim 4, wherein the overcoat is formed as a lubrication layer.

6. The magnetic disk according to claim 1, wherein the magnetic recording section is a multi-layer film formed by laminating an underlayer, a soft magnetic underlayer, an intermediate layer, and a recording layer.

7. The magnetic disk according to claim 6, wherein the overcoat includes a hard overcoat layer and a lubrication layer formed on the hard overcoat layer.

8. A method for manufacturing a magnetic disk comprising the steps of:

forming annular concave and convex portions on a substrate;

forming a multi-layer film which includes at least a soft magnetic underlayer and a magnetic recording layer on the substrate with the annular concave and convex portions;

forming a protrusion at the annular concave portion of the substrate which projects from the annular concave portion so as to have a surface projecting to be higher than a surface of the annular convex portion of the multi-layer film by filling a non-magnetic material in the annular concave portion of the multi-layer film; and forming an overcoat on the multi-layer film and the protrusion;

wherein a surface portion of the overcoat which is formed on the protrusion projects above and is higher than another surface portion of the overcoat which is formed at the annular convex portion of the multi-layer film.

9. The method for manufacturing a magnetic disk according to claim 8, wherein the step of forming the annular concave and convex portions on the substrate includes a step of separating the annular convex portions in a circumferential direction of the substrate.

10. The method for manufacturing a magnetic disk according to claim 8, wherein the step of forming the multi-layer film includes a step of laminating an underlayer, a soft magnetic underlayer, an intermediate layer, a recording layer, and a hard overcoat layer; and the step of forming the overcoat includes a step of applying a lubricant layer.

11. The method for manufacturing a magnetic disk according to claim 8, wherein the step of forming the multi-layer film includes a step of laminating an underlayer, a soft magnetic underlayer, an intermediate layer, and a recording layer; and the step of forming the overcoat includes a step of sequentially forming a hard overcoat layer and a lubrication layer.

12. The method for manufacturing a magnetic disk according to claim 8, wherein the overcoat is applied to a portion between the protrusions with a thickness greater than a thickness over the protrusions.

* * * * *